Nov. 19, 1929.  J. D. ELSOM  1,736,702
INSPECTION INDICATOR
Filed Jan. 14, 1926
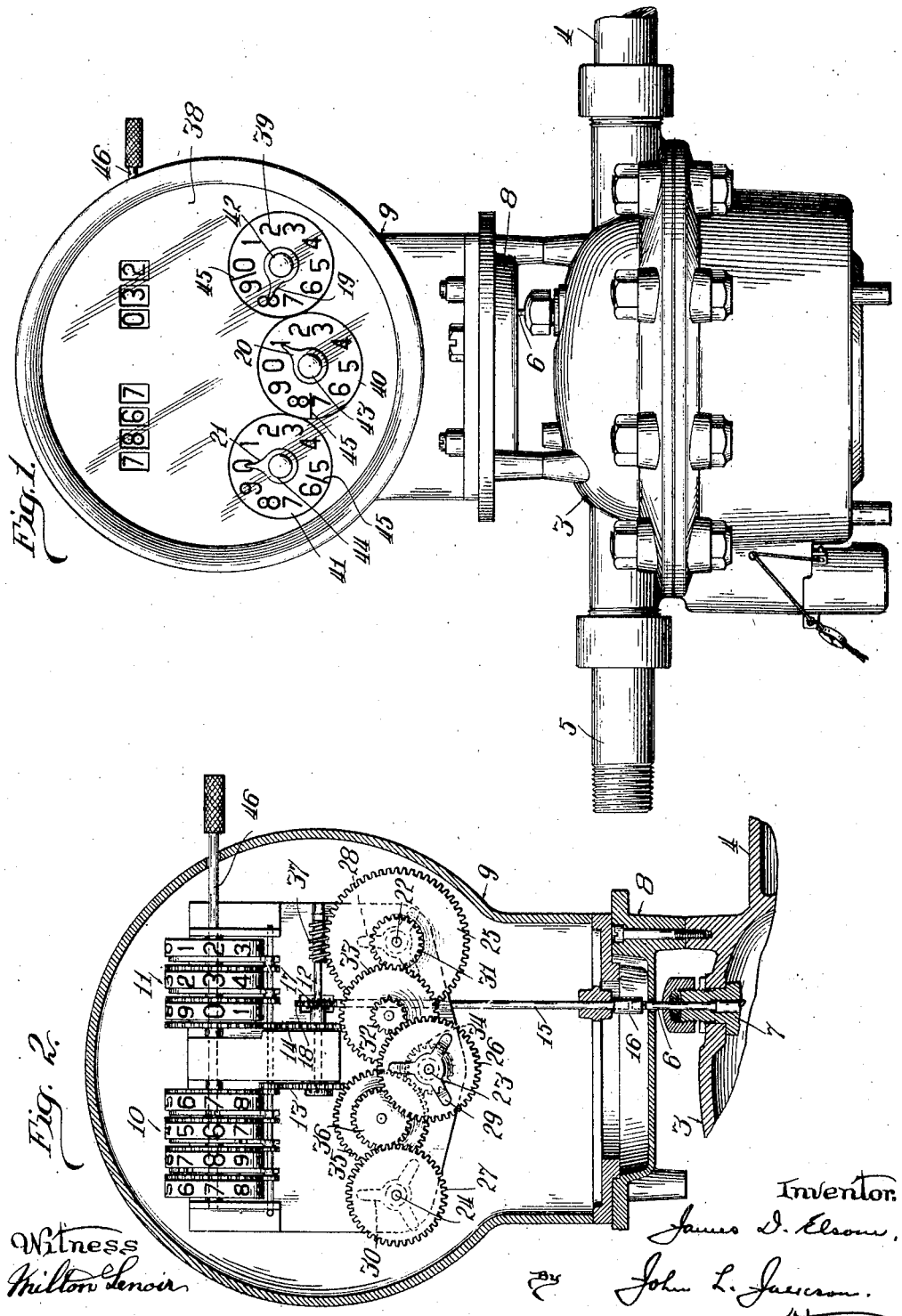

Patented Nov. 19, 1929

1,736,702

UNITED STATES PATENT OFFICE

JAMES D. ELSOM, OF EVANSTON, ILLINOIS, ASSIGNOR TO ECONOMY ELECTRIC DEVICES COMPANY, OF CHICAGO, ILLINOIS, A CORPORATION OF ILLINOIS

INSPECTION INDICATOR

Application filed January 14, 1926. Serial No. 81,242.

My invention relates generally to measuring instruments, but has more particularly to do with devices used in connection with power operated machinery for automatically showing when different operating parts should be inspected in order that such machinery may operate to the best advantage. Power driven machinery, such for example as the engine, running gear and other operating parts of an automobile, to be maintained at a high state of efficiency requires inspection at longer or shorter intervals, depending on the nature of the work it has to do, and obviously the amount of work done by any operating part affords the most accurate basis for fixing the times when it should be inspected. Consequently, as the work performed by machinery driven by power derived from the consumption of liquid fuel is proportional to the amount of fuel consumed, by providing means controlled by the rate of fuel consumption for indicating when different operating parts should be inspected it becomes a simple matter for the operator to give the machinery in his charge the attention which it requires to do its best work. To provide an apparatus for this purpose is the object of my invention. I accomplish this object as illustrated in the accompanying drawings and as hereinafter described. What I regard as new is set forth in the claims.

In the accompanying drawings,—

Fig. 1 is a front elevation showing my invention embodied in an apparatus controlled by the operation of a flow meter of a conventional type; and Fig. 2 is a partial vertical section showing some of the operating parts.

Referring to the drawings,—3 indicates the casing of a meter, which is preferably of the positive displacement oscillating piston type well known in the art, but it may be of any other approved type in which a rotary member is used, the rotation of which is controlled by the rate of flow of liquid through the meter. In the illustrated construction the casing 3 encloses a meter chamber provided with an inlet pipe 4 through which the liquid is introduced into said chamber and an outlet pipe 5 through which it is discharged therefrom. The interior construction of the meter is not shown, as my invention is not concerned with the details thereof beyond the fact that the meter mechanism is such as to effect the rotation of a vertical shaft 6 mounted in a suitable bearing 7 and projecting upwardly above the casing 3, as shown in Fig. 2. Any suitable construction to prevent leakage around the shaft 6, such as the stuffing box shown in Fig. 2, may be employed.

Mounted on the casing 3 is a base 8 on which is supported a housing 9 which contains the registering devices hereinafter described by which the operation of the meter is registered and also different inspection periods are indicated. Preferably registering devices are provided for registering not only the total quantity of liquid passing through the meter, but also the amount metered during shorter periods. For example, where the meter is used for registering the consumption of liquid fuel, the registering devices are arranged to register not only the total consumption of fuel during a predetermined period, but also the fuel consumption during single trips, the latter being arranged to be reset independently of the total register. The registering devices shown are of the cyclometer type, each of the two registering devices comprising a series of rotating discs disposed coaxially, the discs of each set being arranged to carry from one to another according to the decimal system. Any suitable construction for this purpose may be employed, and the same is true as to the resetting devices for the trip registering discs. In the drawings the discs of the total or season register are indicated by the reference numeral 10, and those of the trip register by 11. The units discs of the season and trip registers are driven from a shaft 12 by means of spur gears 13, 14 which are operatively connected with said units discs in any approved way. Such connections need not be described, as they are well understood in the art. The shaft 12 is operatively connected with and is driven from the shaft 6 by means of a vertical shaft 15 connected at its lower end with the shaft 6, preferably by a telescopic connection in the form of a sleeve 16. The upper end of the shaft 15 carries a worm 17 which meshes with a worm wheel 18 mounted on the shaft 12. Thus rotation of the shaft 15 rotates the shaft 12 and effects the operation of the units discs above mentioned.

Associated with the registering devices above described is an inspection indicator comprising a series of pointers 19, 20, 21, mounted respectively on arbors 22, 23, 24 which are frictionally connected with gears 25, 26, 27, respectively, by spring clamps 28, 29, 30, keyed to the several arbors. In the illustrated construction said gears are connected together in a train by suitable intermediate gears 31, 32, 33, 34, 35, 36, but it should be understood that the train of gears shown is merely illustrative, as the number of intermediate gears and pinions used depends upon the relative rate of rotation which it is desired to impart to the several arbors 22, 23, 24. The gear 25, in the illustrated construction, is in the form of a worm wheel which meshes with and is driven by a worm 37 carried by the shaft 12, the arrangement being such that rotation of said shaft effects the rotation of the worm wheel 25 and consequently drives the train of gearing above described, thereby rotating the several arbors 22, 23, 24, and correspondingly moving the pointers carried by them. Obviously the several pointers will move at different rates of speed, depending on the gear ratio of their respective driving connections.

From the foregoing description it will be seen that whenever liquid fuel flows through the meter, the several arbors 22, 23, 24 will be rotated to a corresponding extent, although each of them will not necessarily be rotated to the same extent, as that depends on the gear ratios used. The pointers 19, 20, 21 are arranged to rotate over the surface of a dial plate 38, and associated with them are dials 39, 40, 41 so that the position of said pointers may be conveniently read. On the outer ends of the arbors 22, 23, 24, above the dial plate, are knobs 42, 43, 44 which are fixedly secured to said arbors, so that by turning the knobs the arbors may be turned to reset their respective pointers independently of each other and also independently of the registering devices, this being permitted because of the frictional drive connections between said arbors and the train of gearing by which they are driven.

At any suitable point on each dial is a stationary hand or sign 45 which forms a basis or indicia for showing when inspection is to be made,—that is to say, when the pointer associated with a given dial reaches the stationary sign on such dial, it shows that the time has arrived for inspection of the character indicated by that dial. It will be evident, therefore, that the several dials, which may be of any desired number, may be appropriated to different operating parts of the machinery which require inspection after doing different amounts of work, and nevertheless the different times when inspection is due will be properly indicated by the pointers associated with the several dials so that the operator can tell at a glance just what to inspect. After inspection has been made, the appropriate pointer is reset to its initial position by turning the proper knob. This resetting of course does not affect the other pointers or the registering devices. The trip registering device comprising the discs 11 may be reset without affecting the inspection indicators, and for this purpose the usual resetting shaft 46 is provided which may be connected with the trip registering devices in the usual way.

By my invention I provide an inspection indicator associated with a meter in such manner that the operation of the usual registering devices is not interfered with, while at the same time the time when different operating parts should be inspected, based on the amount of work done by such parts as measured by the fuel consumption, is indicated so that the attendant may keep the different parts of the machinery in proper condition to operate with the greatest efficiency. After inspection of a given part has been made, the corresponding pointer may be reset to its initial position, which may be done without interfering with any of the other pointers.

My invention may be applied to meters intended for measuring gaseous fuel as well as fuel in liquid form.

What I claim as my invention and desire to secure by Letters Patent, is—

1. The combination with an inspection indicator comprising a member operable to indicate a predetermined time for inspection, of means actuated by the consumption of a predetermined amount of fuel for moving said indicator to such indicating position, and means for resetting said indicator.

2. In an apparatus for indicating inspection intervals in automobiles and other liquid fuel burning machines, the combination of a measuring device for measuring the quantity of liquid fuel being consumed, indicating means operably connected to be advanced by said measuring device, and indicia associated with said indicating means for indicating inspection intervals based upon the quantity of fuel consumed.

3. In apparatus for indicating inspection intervals in automobiles and other liquid fuel burning machines, the combination of a measuring device for measuring the quantity of liquid fuel being consumed, a plurality of indicating devices operably connected to be advanced by said measuring device, and indicia associated with each of said indicating devices for indicating inspection intervals for different parts of the machine based upon the quantity of fuel consumed.

4. In apparatus for indicating when different operating parts of an automobile should have attention, the combination of a driving device actuated by the amount of liquid fuel supplied to the automobile engine, indicating means actuated by said driving device in predetermined relation to the quantities of liquid fuel measured by said driving device, and indicia associated with said indicating means for indicating inspection intervals based upon the quantity of fuel consumed.

5. In apparatus for indicating when different operating parts of an automobile should have attention, the combination of a meter for measuring the amount of liquid fuel consumed in the operation of the automobile engine, a plurality of pointers operably connected to be driven in different speed ratios by said meter, and indicia associated with each of said pointers for indicating the periods when certain parts of the automobile should have attention based upon the quantity of fuel consumed by the automobile engine.

6. In apparatus for indicating when different operating parts of an automobile or the like require attention, the combination of a meter for measuring the amount of liquid fuel consumed in the operation of the automobile engine, a plurality of indicating devices driven in different speed ratios by said meter and arranged to indicate the periods when certain parts of the automobile should have attention based upon the quantity of fuel consumed by the automobile engine, and means for resetting said indicating devices independently of each other.

7. The method of indicating inspection periods in an automobile or other liquid fuel burning machine which comprises measuring the quantity of liquid fuel consumed in the machine and operating indicating means in accordance with the measured quantities of fuel consumed for indicating when certain operating parts should have attention.

8. The method of indicating when different operating parts of an automobile should have attention which comprises measuring the quantity of liquid fuel being consumed in the automobile engine, and operating a plurality of indicating devices in different speed ratios in accordance with said fuel measurements and in association with indicia arranged to indicate when certain operating parts of the automobile should have attention based upon the quantity of fuel consumed.

9. In an apparatus for indicating inspection intervals in motors and other liquid fuel burning machines, the combination of means responsive to the quantity of liquid fuel being consumed, indicating means operably connected to be actuated by said first mentioned means, and indicia associated with said indicating means for indicating inspection intervals based upon the quantity of fuel consumed.

10. In apparatus for indicating inspection intervals in fuel consuming engines, comprising the combination of means movable in response to the quantity of fuel consumed, indicating means operably connected to be advanced by said movable means, and indicia associated with said indicating means for indicating inspection intervals based upon the quantity of fuel consumed.

JAMES D. ELSOM.